United States Patent [19]
Lessen

[11] 3,881,669
[45] May 6, 1975

[54] METHOD AND APPARATUS FOR ELIMINATION OF AIRFOIL TRAILING VORTICES

[76] Inventor: Martin Lessen, 9 Idlewood Rd., Rochester, N.Y. 14618

[22] Filed: May 16, 1973

[21] Appl. No.: 360,928

[52] U.S. Cl.................. 244/40 R; 244/130; 416/90
[51] Int. Cl............................................. B64c 23/06
[58] Field of Search... 244/40 R, 40 A, 130, 42 CC; 415/DIG. 1; 416/20, 90, 91, 92, 231, 20 A, 22

[56] References Cited
UNITED STATES PATENTS

| | | | |
|---|---|---|---|
| 2,477,461 | 7/1949 | Lee | 244/40 R |
| 2,650,781 | 9/1953 | Taylor | 244/40 R |
| 3,596,854 | 8/1969 | Haney | 244/40 R |
| 3,692,259 | 9/1972 | Yuan | 244/40 R |

*Primary Examiner*—Trygve M. Blix
*Assistant Examiner*—Charles E. Frankfort
*Attorney, Agent, or Firm*—James A. Drobile, Esquire; Robert S. Bramson, Esquire

[57] ABSTRACT

Herein are disclosed a method and apparatus for eliminating or substantially attenuating the dangerous vortices which typically trail the airfoils of heavier-than-air aircraft in flight. The disclosed method consists of injecting a fluid stream into the core of the vortex (a) in a direction such that the longitudinal axis of the injected fluid stream is substantially colinear and coaxial with the longitudinal axis of the vortex where the injected stream enters the vortex core, and (b) at a momentum flux of such magnitude relative to that of the free air stream that the vortex will be rendered hydrodynamically unstable. The criteria as to the direction and the magnitude of the momentum flux of the injected fluid stream are disclosed as critical to the successful practice of the invention. It is preferable that the departure from colinearity be not more than 4°.

The apparatus of the invention comprises, in combination with an airfoil, a pair of nozzles adapted for injecting a fluid stream of the required orientation and of a momentum flux of such magnitude relative to the free air stream into the trailing vortex that the trailing vortex will be rendered hydrodynamically unstable and apparatus for supplying a suitable fluid to the nozzles.

13 Claims, 5 Drawing Figures

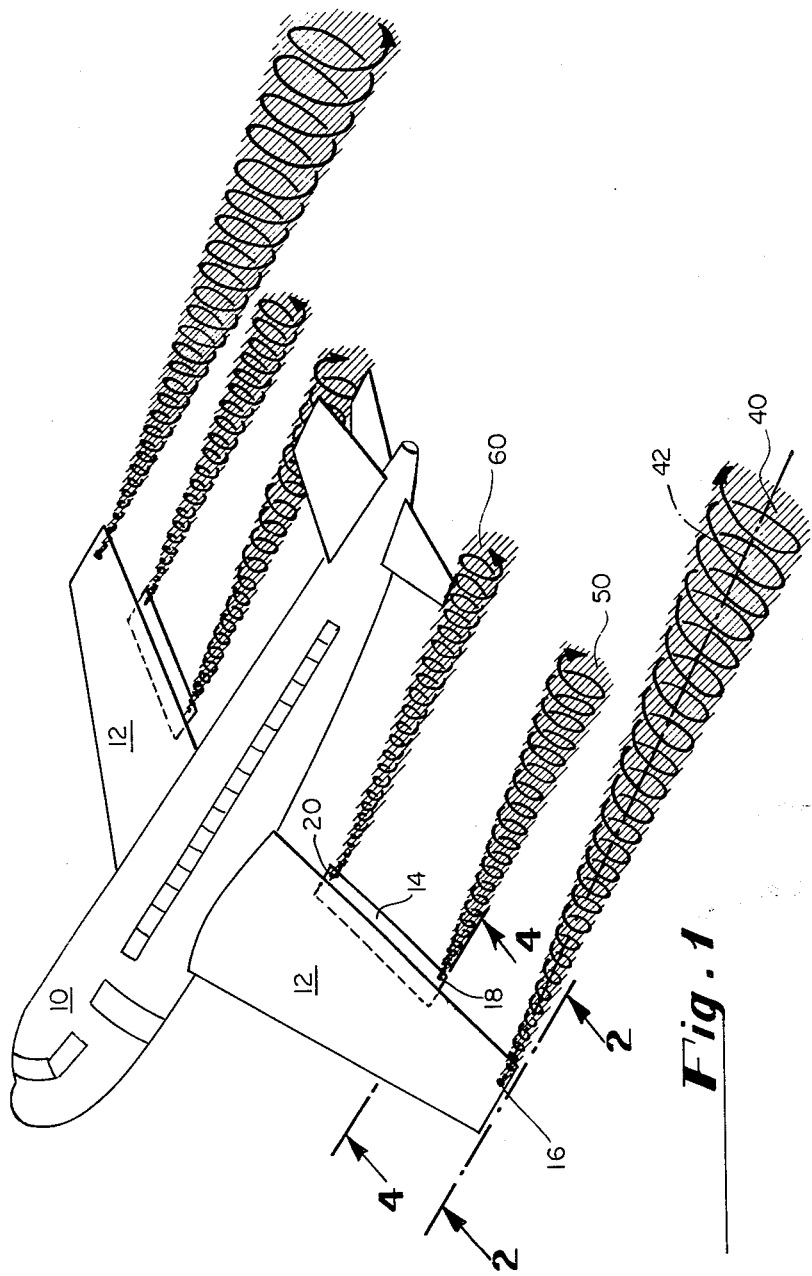
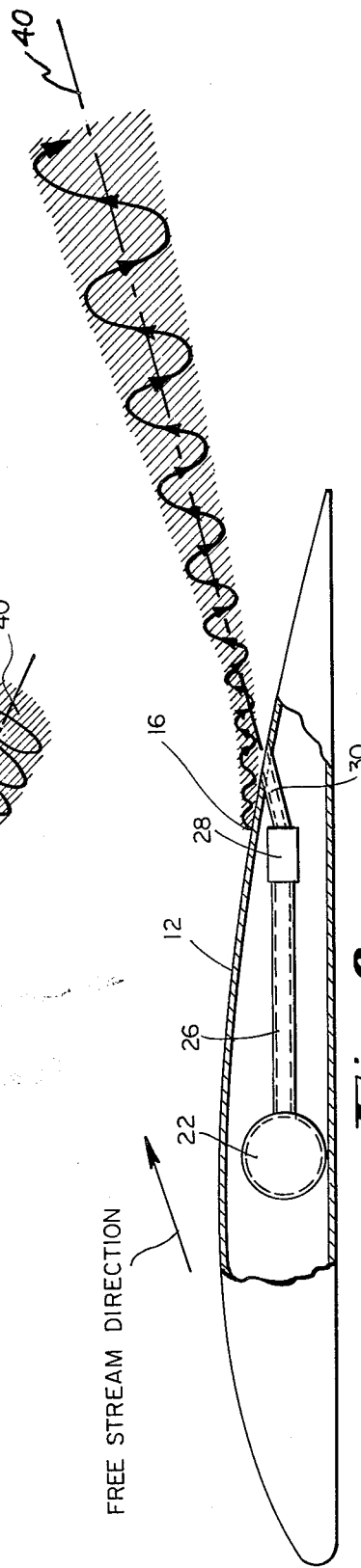

METHOD AND APPARATUS FOR ELIMINATION OF AIRFOIL TRAILING VORTICES

BACKGROUND OF THE INVENTION

1. Field of the Invention

This invention relates to heavier-than-air aircraft, and more specifically to the aerodynamic lifting and/or control surfaces, or airfoils, of such aircraft. In particular, the invention is directed to the substantial attenuation or elimination of the dangerous vortices which typically trail such airfoils in flight.

Trailing vortices exist in the wakes of most airfoils in flight. They primarily originate from, and occur at or near to, discontinuities in the surface of the airfoil such as are present in wing tips, helicopter rotor tips, propeller tips, flap tips, wing roots, and the like. Trailing vortices are generally hydrodynamically stable and attenuate only slowly, primarily by virtue of viscous or laminar dissipation. For this reason, they generally persist for a long period of time after formation, and for a very substantial distance behind the airfoil that has produced them, such as for up to about fifty nautical miles and up to about five minutes.

In the practice of the invention, it is necessary to render the trailing vortices hydrodynamically unstable in order to accelerate their dissipation. A flow of a fluid is said to be hydrodynamically unstable if a disturbance in the flow will grow with respect to time, or equivalently with respect to space. Generally, even in laminar flow, disturbances are always present due to resident turbulence, boundary roughness, and the like. It is these disturbances which, in the state of hydrodynamic instability created by the injection of a fluid stream pursuant to the practice of this invention, grow with respect to time and/or space to dissipate the trailing vortex.

The vortices trailing a large aircraft, particularly at low speed during take-off and landing, present a common and serious hazard to following aircraft. Thus, a following aircraft, encountering the rotating flow pattern of such a trailing vortex, may be thrown suddenly off its flight path and thus caused to have a serious accident. The prevalence of this modern-day hazard has necessitated the imposition of limitations on the flight paths and separation distances of crossing and following aircraft. The elimination or alleviation of this hazard would allow a safe increase in the traffic density into and out of airports. In addition, it would more safely allow maneuvers such as formation flying and aerial refueling.

Since each blade of a helicopter rotor in flight also functions as an airfoil, such a blade also produces an associated trailing vortex. During certain flight maneuvers, a rotor blade may encounter the trailing vortices produced by preceding blades and thus be exposed to a rapidly- and wildly-varying fluid flow field. Such encounters commonly produce a loud and objectionable noise, termed "blade slap," and also cause sudden variations in blade stresses which in time may cause the fatigue failure of one or more blades.

2. Description of the Prior Art

Extensive and continuing efforts have been made by the aircraft industry in attempts to eliminate the hazard inherent in the trailing vortices normally associated with airfoils in motion. Previous proposals have included schemes involving the injection of turbulence into the vortex by means of perforated airfoil tips and tip spoilers, the rearrangement of the trailing vortex through the use of various wing and tip planforms, end plates and gulled outer panels, the displacement of the trailing vortex by spanwise and angled blowing, and the mounting of swirl generators and jet engines on the wing tips. None of the schemes heretofore proposed has provided a satisfactory solution to the problem because the hydrodynamic instability mechanism has not been utilized. Accordingly, it is a particular object of this invention to provide a new and improved technique for eliminating or substantially attenuating the trailing vortices associated with airfoils in flight.

BRIEF SUMMARY OF THE INVENTION

The present invention consists of a method and apparatus, the use of which produces a rapid and substantial attenuation or elimination of a vortex trailing an airfoil in flight. Specifically, the method of the invention consists of injecting a fluid into the core of the trailing vortex consistent with certain critical criteria. Thus, it is essential to the successful practice of the method of this invention (1) that the axis of the injected fluid stream be colinear and coaxial with the axis of the trailing vortex at or substantially at the point of entry of the fluid stream into the vortex core, and (2) that the momentum flux (rate of flow of momentum) of the injected fluid stream, relative to the free air stream, be sufficient to produce hydrodynamic instability in the trailed vortex.

As used herein, the "longitudinal axis" of a trailing vortex at any section of the vortex is the centerline of the vortex in its direction of movement from the airfoil. In this regard it is to be noted that the trailing vortex usually follows a curvilinear path and the longitudinal axis will therefore be curvilinear.

As used herein, the "longitudinal axis of the injected fluid stream" is the centerline of the stream in its direction of flow.

As used herein, the "free air stream" proximate an aircraft is the flow past the aircraft which would also be present if the aircraft were not there.

Apparatus useful in practicing the method of the present invention comprises means for forming, conducting, and directing a flow of fluid for proper injection into the trailing vortex, and for supplying the desired flow of fluid.

BRIEF DESCRIPTION OF THE DRAWINGS

FIG. 1 is a schematic representation of an aircraft, illustrating the trailing vortices from the wings and flaps;

FIG. 2 is a side elevational view, partly in section, along line 2—2 of FIG. 1;

Figure 3:
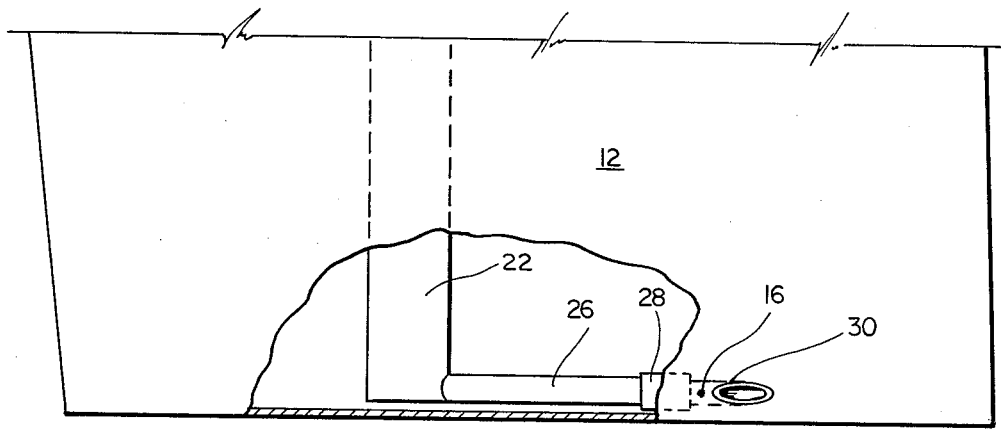
FIG. 3 is a top plan view of the wing of FIG. 2, partly broken away.

DETAILED DESCRIPTION OF THE INVENTION (INCLUDING DESCRIPTION OF THE PREFERRED EMBODIMENTS)

It has been found that the vortex trailing from an airfoil in flight can be substantially attenuated or eliminated by injecting a fluid stream into the core of the trailing vortex under certain critical conditions. It thus is essential to the successful practice of this invention that the longitudinal axis of the injected fluid stream be substantially colinear and coaxial with the longitudinal axis of the core of the trailing vortex, and that the injected fluid stream be injected at a momentum flux, relative to the free air stream, which is of such a magnitude as to render the thereby modified trailing vortex hydrodynamically unstable.

While any gaseous fluid can be utilized for injection into the core of the vortex, air is the most convenient and economical fluid for such purpose and therefore is distinctly preferred.

It is essential to the successful practice of this invention that the axis of the injected fluid stream be substantially colinear and coaxial with the longitudinal axis of the trailing vortex. Efforts to significantly attenuate or eliminate a trailing vortex through the injection of a fluid stream into the trailing vortex along an axis other than one which is substantially colinear and coaxial with the longitudinal axis of the separated trailing vortex have been unsuccessful. In particular, it is preferable that no more than four degrees of misalignment exist. Otherwise, some forfeiture of the beneficial results of the invention has been observed.

As noted hereinabove, it also is essential that the longitudinal axis of the injected fluid stream be substantially colinear and coaxial with the longitudinal axis of the core of the trailing vortex at or substantially at the point of entry of the stream into the vortex core. So long as this criterion of substantial colinearity and coaxiality at the point of entry is observed, the point of injection will not be critical to the successful practice of the invention. Thus, a substantial attenuation or elimination of a trailing vortex can be achieved through such colinear and coaxial injection of a fluid stream either upstream from, downstream from, or at the point of separation of the trailing vortex from the upper surface of the airfoil. Injection after separation produces superior results and is therefore distinctly preferred.

The criterion of coaxiality and colinearity requires a determination of the path of flow of the trailing vortex over the upper surface of the airfoil, and of the area of separation of the trailing vortex from the airfoil. Both the flow path and the area of separation for a trailing vortex will depend upon the particular configuration of the airfoil and, to a degree, may also depend upon the operating conditions of the aircraft. However, with respect to a wing or rotor blade, the variations in trailing vortex properties can usually be accommodated by one set of design conditions for the fluid injection means, so that a fixed fluid injection means will usually function adequately for the purposes of the invention. With respect to a flap and, in some instances, with respect to a wing or rotor blade, a movable fluid injection means will be desirable to accommodate variations in the position of trailing vortex axis with respect to the airfoil. It has been determined, for example, that the point of vortex separation for a fixed wing having a square tip typically occurs on the upper surface of the airfoil directly above a point on the wing chord about 75 per cent of the distance along such chord from the leading edge to the trailing edge, and at or very near the tip of the wing. The flow path of a vortex trailing from such an airfoil also is of a characteristic shape.

The exact profile or path of flow, and the location of the area of separation, for a vortex trailing a particular airfoil configuration can be determined experimentally by means of conventional techniques and apparatus. An example is a flow visualization technique to accomplish the demarcation of the vortex trail which uses small hydrogen or helium bubbles of neutral bouyancy that therefore move along streamlines. Near the trailing vortex, these streamlines wrap in helical fashion about the longitudinal axis of the vortex and it can thereby be located and recorded photographically.

It also has been found that the injected fluid stream must be injected at a momentum flux which is of sufficient magnitude, relative to the free air stream, to render the modified trailing vortex hydrodynamically unstable. When the flow is rendered hydrodynamically unstable, elemental disturbances which are always present will grow. The energy from the combined axial and swirling flow will be transformed to disturbance energy which will cause the directed flow energy to dissipate in turbulence. The momentum flux may be increased or decreased in the practice of the invention based on three variable conditions, as follows: (1) the free air speed; (2) the induced drag (which depends on the angle of attack of the airfoil); and (3) the distance at which it is desired substantially to dissipate the trailing vortex. Accordingly, for a given airfoil, variable flow rates of injected fluid may be required to accommodate the foregoing variable conditions. Therefore, the source of injected fluid must be provided with means for supplying the injected fluid at a flow rate which is adequate for the range of anticipated operating conditions. In practice, for a given aircraft, the conditions of take-off and landing are sufficiently limited that one magnitude of momentum flux will function to dissipate the vortex trailing a given point on an airfoil. For normal flight, a different magnitude may be required.

Viewing FIG. 1, the apparatus of the invention is illustrated in connection with an airplane in take-off or landing configuration having wings with trailing edge flaps extended and depressed. The airplane itself is generally designated by the numeral 10, the wings are generally designated by the numeral 12, and the flaps are generally designated by the numeral 14. Although, in the drawings, the ensuing description will relate to the left-hand wing as seen in FIG. 1, the apparatus for the right-hand wing will be identical to the apparatus for the left-hand wing, except that it will be a mirror image with respect thereto.

As seen in FIG. 1, three trailing vortices are formed with respect to each of the wing units. There may also be a fourth trailing vortex at the wing root. A first vortex is formed, departing from the main airfoil at an area of departure, generally designated by numeral 16. The areas of departure for the two vortices which form with respect to each flap 14 are respectively designated by numerals 18 and 20.

The wing of FIG. 1 is illustrated as a straight wing, and the shape of the flap of FIG. 1 is also of a straight-wing configuration. However, as more fully discussed below, the apparatus and process of the invention are applicable to straight wings and to wings of other configurations as well.

In the straight-wing configuration illustrated, the trailing vortex forms at a point approximately 75 per cent of the distance from the leading edge of the wing toward the trailing edge of the wing and at or proximate from the outer edge of the wing. Therefore, as seen in FIG. 1, there are three trailing vortices produced with respect to each wing of the airplane.

As best seen in FIGS. 2 and 3, the wing 12 includes a transversely extending duct 22 which extends from an air supply such as the compressor of one of the jet engines or an auxiliary driven compressor, to a point proximate the outer tip of the wing. The cross-sectional shape of the duct 22 can be designed to conveniently fit within the wing and is not relevant to the invention, so long as it is a streamlined shape.

The precise location of the duct 22 is not critical, although it is desirable that it extend along a sufficient portion of the wing to be able to supply air to the nozzles, to be described below, which discharge at the points 16, 18 and 20 on the wing and flap.

As seen in FIG. 2, duct 22 is in fluid communication with rearwardly extending conduit 26, which may interconnect duct 22 with a swirl generator 28, which is an optional feature of the invention, and when present communicates with the input end of discharge nozzle 30. If no swirl generator is utilized, conduit 26 is connected directly to nozzle 30.

The particular size of conduit 26 will vary in accordance with the particular airfoil in question, and would extend directly rearwardly from duct 22 to the swirl generator 28.

Connected to the output end of conduit 26 is the swirl generator 28, which is an optional feature of the invention. The swirl generator 28 comprises a multiplicity of curved vanes mounted fixedly about the periphery of the conduit in which they are contained and curved in a clockwise or counterclockwise direction to impart a similar rotational component to the movement of air therethrough. The direction of the swirl imparted to the air is opposite to the rotational movement of the trailing vortex it is intended to dissipate. The function of the swirl generator is to impart an opposing rotational velocity to the air ejected from nozzle 30 with respect to the vortex to be dissipated. This condition creates a condition of hydrodynamic instability, known as a Taylor-Gortler instability, close to the nozzle, which creates turbulence in the trailing vortex core flow.

Connected to the output end of swirl generator 28 is nozzle 30, the purpose of which is to discharge air transported through duct 22 and conduit 26 into the core or center of the trailing vortex 40 over the upper surface of wing 12 and separates from the wing at about point 16. As seen in FIG. 1 and in FIG. 2, the trailing vortex 40 has a centerline designated by numeral 42. Although the centerline is schematically represented as a straight line, it is usually curved but identifiable at any distance of the vortex from the wing. The nozzle 30 discharges pressurized air in a direction which is colinear and coaxial with the axis 42 of the vortex at the point of entry of the air stream into the vortex core. The discharge point may be at the wing surface, as illustrated, and may also efficaciously be located at any other point, spaced from the wing surface, and along the longitudinal axis of the vortex. As more fully described above, the air stream discharged from nozzle 30 is discharged at a flow rate of such a magnitude that it has a magnitude of momentum flux, relative to the free air stream, which is sufficient to render the trailing vortex with which it combines hydrodynamically unstable.

It is preferable that no more than four degrees of misalignment between the direction of injection of the air stream from nozzle 30 and the axis 42 of the vortex 40 at the point of entry of the stream into the vortex core be permitted in order to achieve optimum results.

The configuration of the axis 42 of trailing vortex 40 with respect to the wing 12 can be predetermined, in the manner described above, and will vary depending on the shape and angle of attack of the airfoil. Typically, for the wing disclosed in the drawings, that angle with respect to the longitudinal (i.e., fore and aft) axis of the wing 12 would be roughly equal to the angle of attack of the wing. Therefore, the nozzle is so located as to discharge air at about the angle of attack with respect to the longitudinal axis of the wing. Although the nozzle is illustrated as discharging at the wing surface, it may extend beyond the wing surface or be mounted spaced from the wing surface; the critical criteria for nozzle location are that it discharge in a coaxial and colinear direction with respect to the axis of the trailing vortex at the point of entry of the fluid stream into the core of the vortex.

Figure 4:
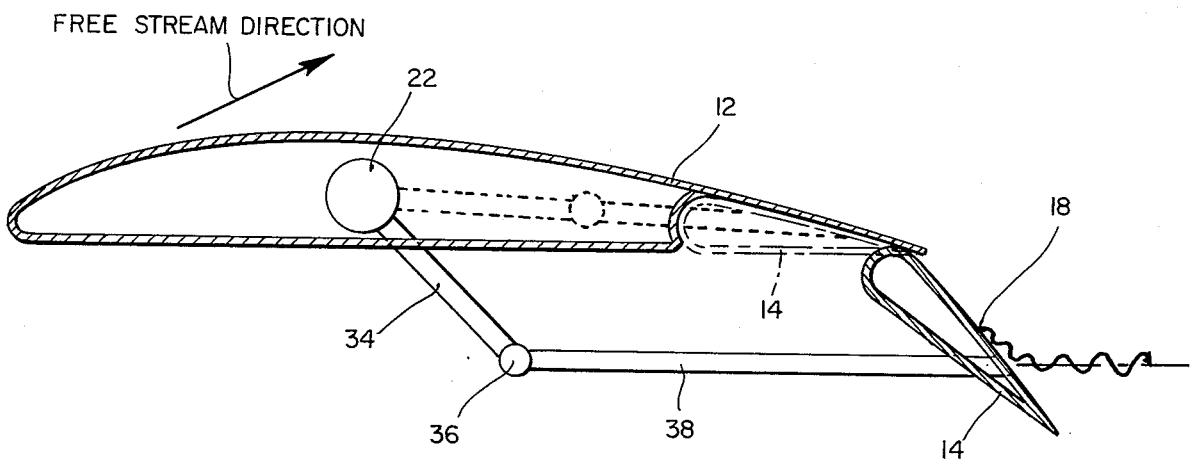
FIG. 4 is a cross-sectional view along line 4—4 of FIG. 1, and showing the duct work and nozzle for modifying the trailing vortices on the flap.

FIG. 4 illustrates the portion of the apparatus utilized to dissipate the trailing vortices 50 and 60 which are formed over the upper surface of wing flap 14 and separate therefrom proximate the respective points 18 and 20 at the edges of the wing flap 14. Viewing FIG. 4, it will be seen that the duct 22 is in direct fluid communication with a conduit 34 which is connected through hinged elbow to telescopic nozzle section 38 which is mounted at its distal end in flap 14. The nozzle is rotatably mounted in and extends through the upper surface of flap 14. The conduit 34 and nozzle 38 are rotatable by hydraulic or other suitable means mounted in the wing (not shown) from the position shown in phantom in FIG. 4 in which conduit 34 is substantially located within wing 12 (through a suitable aperture in its lower surface) to the position also shown where the flap is extended and lowered. The angle of discharge of the nozzle 38 with respect to flap 14 is therefore varied, depending upon the position of the flap. This connection is so designed that the nozzle always discharges coaxially and colinearly with the trailing vortex from the flap at the point of entry into the core of the vortex.

The specific design conditions of the nozzle in relation to the size and shape of the flap are determined in the manner more fully discussed above to produce the desired magnitude of momentum flux.

The nozzle therefore discharges air colinear and coaxial with the axis of the trailing vortex 50 at the point of entry into the vortex core. Because the angular position of flap 14 with respect to the horizontal axis of wing 12 will vary during flight, the angle which the trailing vortex 50 makes with respect to the axis of flap 14 will vary, depending upon the angle of the flap. Therefore, the angle of discharge of nozzle 38 with respect to the axis of the flap must vary commensurately. This relationship may be achieved by the rotatable mounting of nozzle 38 described above.

The ducts and mechanisms located at the other end of flap 14 to dissipate the trailing vortex 60 which forms at point 20 will be similar in size and configuration to those illustrated in FIG. 4.

In a wing which has a trailing vortex formed over the wing root, an air feed and nozzle mechanism similar to that disclosed with respect to the wing tip can be incorporated in the wing discharging coaxially and colinearly with the axis of the wing root vortex at the point of entry into the core of the vortex.

Figure 5:
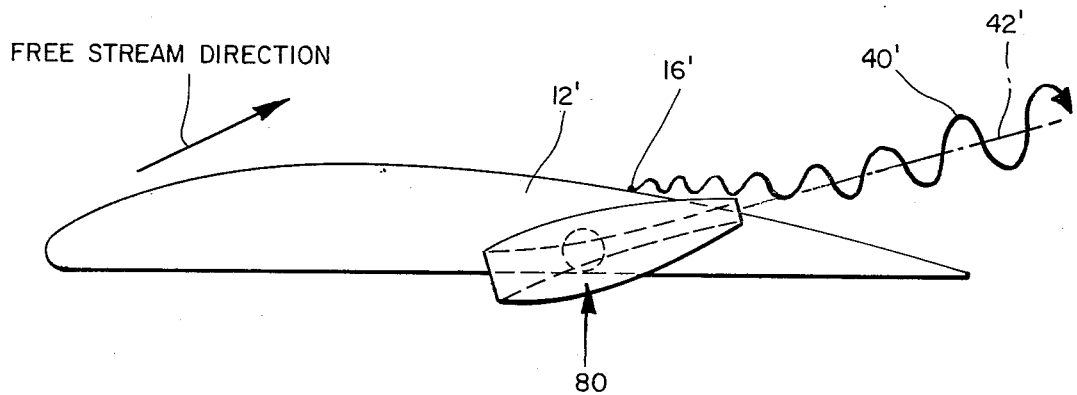
FIG. 5 is a side elevational view of another embodiment of the invention, showing a wing and utilizing a jet engine for discharging into the trailing vortex.

FIG. 5 illustrates another embodiment of the invention, in which, rather than utilize the high pressure duct illustrated in FIGS. 1 through 4, inclusive, a jet engine 80 is rotatably mounted on outer tip of wing 12' for the purpose of dissipating the trailing vortex 40' which separates at about point 16' on the wing. The jet engine 80 operates to produce an exhaust having a momentum flux and angle of discharge as described above with respect to nozzles to dissipate the trailing vortex. The angle of discharge of the jet exhaust will vary in accordance with the shape of the wing, as necessary to discharge in a colinear and coaxial direction with respect to the axis 42' of the trailing vortex 40' at the point of entry into the core of the trailing vortex. The jet engine may, if desired, be rotatably mounted on the wing tip or in any other convenient location, so that it may rotate from an angular position used to dissipate a trailing vortex to an optimum attitude for thrust propulsion of the aircraft.

In one example of the invention, the airfoil had an NACA 0012 section, a chord of 21.2 inches, a semispan of 5 feet, and a twist of 0.35° per foot which created an increasing angle of attack towards the tip. The free air stream velocity was 150 feet per second. The nozzle was a subsonic type of nozzle, circular in cross-section and 1.25 inches in diameter. The flow rate of air through the nozzle was 0.38 pounds per second with a stagnation temperature equal to the free stream stagnation temperature. The nozzle discharge was located at the 75 per cent chord point from the leading edge and 0.85 inches from the squared-off airfoil tip. The angle of attack of the airfoil was 9.5° at the tip and the nozzle injection angle was in the direction of 9.5° upward from the longitudinal axis of the airfoil. At 6.5 chord lengths downstream from the airfoil, it was observed that the peak velocity of the injected vortex was less than 10 per cent of a vortex created under the same conditions and not injected.

Although the invention has been described with respect to a straight wing airfoil design, it can equally well be applied to airfoils having planform shapes other than straight wings. The location and configuration of the axis of the trailing vortex from the airfoil can be determined experimentally for each airfoil in the manner described above, or may be determined theoretically.

As discussed herein, the principles of the invention are equally applicable to the blades of a helicopter rotor, and the size, angle of discharge, point of discharge and operating conditions of the nozzle for dissipating trailing vortices from blades of helicopter rotors will be substantially similar to those described above in connection with airplane wings and determined in accordance with the principles herein described.

The invention claimed is:

1. Method for rapidly dissipating the vortex trailing an airfoil in flight, said method consisting of injecting a substantially linear fluid stream substantially coaxially into said vortex (a) in a direction such that there is no more than about four degrees of misalignment between the longitudinal axis of the injected fluid stream and the longitudinal axis of said vortex substantially at the point of entry of the stream into the core of the trailing vortex, and (b) at a substantially linear momentum flux of such magnitude relative to that of the free air stream that said trailing vortex will be rendered hydrodynamically unstable, whereby disturbances and hence turbulence in said vortex will grow rapidly to dissipate said vortex.

2. Method according to claim 1 wherein said fluid is a gas.

3. Method according to claim 2 wherein said gaseous fluid is air.

4. An airfoil, said airfoil having an upper surface over which a vortex is formed and from which said vortex trails, said airfoil having a trailing edge, said trailing vortex having a core and defining a curvilinear longitudinal axis, and means mounted on said airfoil and spaced from said trailing edge for injecting a fluid substantially linearly into said trailing vortex in a direction substantially coaxial and colinear with no more than about 4° of misalignment from said axis at the point of entry into the vortex core and at a substantially linear momentum flux of a magnitude relative to the free air stream proximate the airfoil which renders the modified trailing vortex hydrodynamically unstable, whereby disturbances and hence turbulence in said vortex will grow rapidly to dissipate said vortex.

5. An airfoil as set forth in claim 4, said means comprising an elongated duct mounted within said airfoil and having a first and a second end, a source of compressed air, means interconnecting said first end of said duct with said cource of compressed air, a nozzle having a longitudinal axis, means on said airfoil mounting said nozzle with its axis extending in a direction substantially colinear and coaxial with the axis of said vortex at the point of entry of the discharge from said nozzle into the core of the vortex, and means interconnecting said nozzle and said duct.

6. Apparatus as set forth in claim 5, including swirl generating means mounted between said nozzle and said duct.

7. Apparatus as set forth in claim 4, wherein said means comprises a jet engine, means mounting said jet engine on the said airfoil, said jet engine having a discharge end directed colinear and coaxial with the axis of said trailing vortex at the point of entry of said discharge into the core of the vortex.

8. An airfoil in accordance with claim 4 comprising a wing of a fixed-wing aircraft.

9. An airfoil in accordance with claim 4 comprising a wing of a variable-wing aircraft.

10. An airfoil in accordance with claim 4 comprising a rotor blade of a rotating blade aircraft.

11. Apparatus as set forth in claim 5, including means rotatably mounting said nozzle to vary its angle with respect to the longitudinal axis of the airfoil.

12. Apparatus as set forth in claim 4, wherein said airfoil comprises a flap of a fixed-wing aircraft.

13. Apparatus as set forth in claim 12, wherein said means are rotatably mounted with respect to the longitudinal axis of said airfoil.

* * * * *